INVENTOR
JACOB MARCOVITCH
By Shoemaker and Matter
Attys.

Feb. 2, 1971

J. MARCOVITCH 3,559,242

HIGH PRESSURE CELLS

Filed March 12, 1968

INVENTOR
JACOB MARCOVITCH
By Shoemaker and Mattare
ATTYS.

United States Patent Office 3,559,242
Patented Feb. 2, 1971

3,559,242
HIGH PRESSURE CELLS
Jacob Marcovitch, Johannesburg, Transvaal, Republic of South Africa, assignor to Rotary Profile Anstalt, Vaduz, Liechtenstein
Filed Mar. 12, 1968, Ser. No. 712,498
Int. Cl. B29c 3/00
U.S. Cl. 18—16                                    27 Claims

ABSTRACT OF THE DISCLOSURE

The invention is concerned with the method and apparatus for generating or dissipating very high pressures by means of enclosing a reaction zone in a continuous mass of material of low tensile strength and having no sudden change in sectional shape. This material is enclosed in a sheath of high tensile strength material and pressure magnifying or reducing bodies are included in the mass of material. This assembly enables very high pressures to be generated in the reaction zone and controlled through energy absorbed by interparticulate friction in the mass of the low tensile strength material.

BACKGROUND OF THE INVENTION

This invention relates to high pressure generating apparatus, to the method of obtaining the high pressure and to the utilization thereof.

A typical but non-limitative example of such operations is the conversion of graphite or other carbonaceous material to diamond.

Such operations are normally carried out commercially in a reaction space bounded by inner faces of solid press elements some or all of which are movable to compress the material in the reaction space. The pressure which can be applied is mainly limited by pressure the inner faces of the press elements can withstand without cracking.

Various machines have been developed in an end-saw to provide controlled increased pressures.

In the "Belt" type of apparatus the limit of pressure corresponds roughly to the tensile strength of the tungsten carbide used in the construction of the cylinder and the anvils. Prestressing and bolstering these elements has enabled the maximum pressures to be increased to a limited extent. In the multi-anvil types of apparatus the problems encountered are in the relatively larger pieces of carbide, suffering from compound stressed in use. In all types of apparatus, the use of binding rings or other aids, although helpful to some extent, merely transfer the problem to a different place of larger dimensions. Nevertheless the maximum pressure attainable is still limited by the physical properties of the materials used in constructing the cells.

As far as the applicant is aware, the maximum pressure claimed to have been reached in the known art is of the order of 3,000 tons per square inch in very small volumes, probably of a match-head size in a laboratory.

OBJECTS OF THE INVENTION

It is generally the object of this invention to provide a pressure cell in which the foregoing limitations are overcome to considerably increase the pressures attainable above the previously attainable 3,000 tons per square inch.

A further object of the invention to utilize such pressures on larger volumes than has heretofor been possible.

SUMMARY OF THE INVENTION

According to this invention there is provided apparatus for containing high pressures comprising a reaction zone surrounded by a continuous mass of material of low tensile strength enclosed in an outer shell of material having high tensile strength.

Further features of this invention provide for there to be rigid pressure magnifying bodies symmetrically arranged around the reaction zone, for the low tensile strength material to be particulate material of varying sizes, for the reaction zone to be sheathed in a deformable refractory material and for the shell to be of substantially spherical shape.

This invention also provides a method of generating high pressures at a reaction zone comprising the precompression of a continuous mass of material of low tensile strength around the reaction zone and subsequently generating a further pressure at the reaction zone while maintaining the low tensile strength material in the precompressed state.

All materials are capable of withstanding any amount of compression. They only fail in tension. Suppose the space between the reaction zone or specimen and the shell is made in solid steel and the pressure is increased in the central space. The steel would deform, yield and initiate a crack on its inner surface propagating through to the outside, terminating in failure of the cell. Stronger materials, such as tungsten carbide would fail even more readily.

Particulate material such as sand, however is devoid of any tensile strength and an increase of pressure would merely cause a realignment of the grains. It is able to "flow" yet it does not transmit equal pressures at all points such as a fluid does. It is capable of dissipating pressure in a similar manner as a solid yet it can withstand any amount of pressure. It is the ideal material for high-pressure cells if used correctly.

Ductile materials such as lead which is self-annealing at ambient conditions of temperature and pressure are considered to have sufficient internal friction to give the same type of effect as discrete particulate material. Steel at higher temperatures is equally ductile or plastic. At higher pressures and lower temperatures it also exhibits similar plasticity or ductility. In the inner regions of the cell these ductile materials could be used as pressure dispersion means, whilst in the outer region, where there is less "give" or movement, they would be used as pressure absorbing means, especially if they had high tensile stainless steel or piano wire embedded in their mass to relieve the casing of its arduous tensile duty.

Unfortunately as all known materials yield or compress under pressure in practice the loss of volume relative to the reaction space reduces the pressure build-up. It is an important feature of the invention to minimise all such possible loss.

Careful consideration must be exercised in selecting the materials for the cell.

The ductile materials possess rather greater compressibility. The harder materials such as diamond yield far less and in order to reduce the voids into which the particles may crumble under pressure causing a loss of pressure, a graded ceramic or material is selected having varying grain size and it is preferred to admix the mass of crystalline material with ductile material.

Gold, for example, has a great affinity for penetrating the pores of certain hard ceramics, filling all available voids.

Hereinafter, ductile material, graded crystalline material or mixtures thereof will be referred to as particulate material.

It is anticipated that the cell will yield new products, as yet unknown, such as the harder and denser forms of carbon and these in turn will be used to reduce the size of the cell and to increase the pressures and temperatures used, to yield further new products.

Freezing the mass by allowing liquid nitrogen to evaporate thru it before pressure build up may also be resorted to.

Enclosing the shell in a hydraulic jacket subjected to high pressure fluid serves to nullify its expansion and to precompress the body.

For large pressure build-up all possible means of external pressure or precompression must be resorted to as the available internal means, such as expansion of material by internal heating and chemical reactive means, other than nuclear means, tend to be counteracted by large internal pressures.

BRIEF DESCRIPTION OF THE DRAWINGS

Reference will now be made to the drawings in this specification in which.

DETAILED DESCRIPTION OF THE INVENTION

The invention is described below in general terms to indicate to those skilled in the art some preferred embodiments which it is envisaged can be reduced to practice with the exercise of known engineering and technical skills not forming part of this invention.

Figure 1:
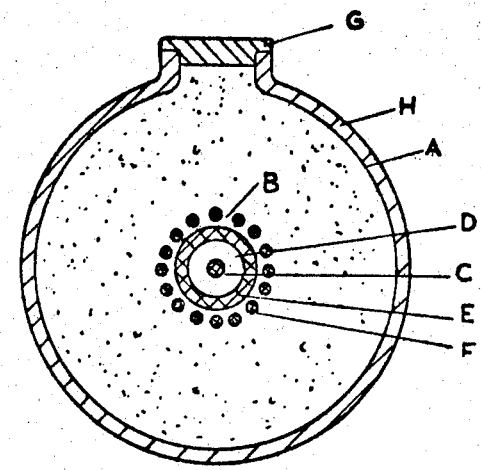
FIG. 1 illustrates diagrammatically a pressure cell according to the invention.

Consider FIG. 1. It depicts the invention in its simplest form. At C a nuclear reaction is allowed to take place, and it will probably vapourize the immediate space D next to it of a suitable heat resistant material E such as "wonderstone" which is thick enough to allow the layer to exist in a quasiplastic state and seal the gaseous reactants off from the specimens F embedded in a particulate material such as sand and at a diameter B and extending to the outer spherical casing of steel at H. Cooling coils and other control details thru the cover G are omitted for the sake of clarity.

It will be seen that the geometry and interparticulate friction favours the dispersion of the pressure at B to the outside casing at A and the pressure prevailing at A will be accordingly reduced and it is purely a matter of size to cater for an increase in pressure.

However, until more is known about controlling nuclear reactions and until such a cell is built it is preferred to resort to more realizable means embodying the same concept.

Reverting to the "nuclear cell" of FIG. 1 to illustrate the problems encountered in high pressure cells it has been assumed that the nuclear reaction has sufficient energy to "follow thru" the compressive yield of the materials used.

In one particular embodiment of this invention shown in FIGS. 2 and 3 it will be described as applied to the treatment of graphite to convert it to diamond. In this application the graphite or carbonaceous mixture 1 is enclosed in a preferably spherical layer 2 of pyrophyllite or like material which is resistant to the temperatures to which it is to be subjected. Against one side of the temperature resistant layer is placed a cup shaped layer 3 of material which is chemically reactive explosively or implosively if desired to produce a large quantity of reaction products which at normal temperatures and pressures would be gaseous. This above described assembly may, if desired, be enclosed in a further layer of material which will remain solid but ductile or self-annealing.

The complete assembly above described bounds a central reaction zone which is then enclosed in a spherical mass of discrete particulate material 4 which may be many feet in diameter and is itself enclosed in a spherical casing 5.

Projecting inwardly from the casing 5 into the discrete material 4 are a series of wedges 6 preferably of conical shape, and spaced a substantial distance apart. These wedges 6 project from the casing so that they are also generally arranged in a spherical pattern. It is preferred that the inner ends 7 of the wedges 6 be rounded and the sides 8 of concave arcuate shape.

The wedges 6 are used for pre-compressing the particulate material and magnifying the pressure and for this purpose may be backed by rams 9 or any other means by which they may be forced inwardly into the casing to precompress the discrete material therein by violent explosions or by the utilization of the kinetic energy of high velocity masses such as projectiles depicted at 9', while at the same time a large torque is superimposed on them through torque applicator 20 acting on splines 21. This is done from at least three equally spaced directions simultaneously.

Between the inner ends 7 of the wedges 6 and the reaction zone may be provided a series of inwardly coned segments 10 made of solid material such as ceramics and generally arranged in a spherical pattern around the reaction zone. These segments 10 are appreciably more closely spaced then the wedges 6 and thus bound the reaction zone more closely than would be possible with the wedges. The purpose of the segments 10 is to act as means for further magnifying and transmitting pressure from the inner ends 7 of the wedges 6 to the reaction zone.

Through the surface of the casing 5 opposite the cup-shaped layer 3 of chemically reactive material is an opening fitted with a suitable closure 11. The casing also encloses an envelope 12 to receive high pressure fluids 13 thru inlet 22.

To subject the graphite to high pressure and temperature the wedges 6 are initially forced into the discrete material 4 to effect pre-compression in the reaction zone and aided by the pressurized fluid 13. The basic function of the discrete material 4 is, at a later stage of the process, to dissipate pressure from the reaction zone outwardly by the effect of the inter-particle friction assisting the inherently favourable pressure dissipating geometry of the cell. Since the discrete material 4 will dissipate outwardly directed pressure it will equally tend to hinder inwardly directed pressure, thereby resisting pre-compression.

During pre-compression this resistance can be off-set to some extent by vibrating or otherwise subjecting the complete assembly to a percussive action.

By forcing the wedges 6 inwardly it is possible to obtain high pressures in the vicinity of the inner ends 7 of the wedges. This pressure can be transmitted and magnified to the close vicinity of the reaction zone, by ensuring that there is a relatively small thickness of discrete material 4 between firstly the wedges 6 and segments 10 and secondly between the segments 10 and reaction zone. This, together with any percussive or precooling or other operations, if used, will ensure maximum pre-compression. The pre-compression by itself may be sufficient to produce the desired pressure. Anvils indicated at 14 and cooling circuits indicated at 15 may be used for this purpose.

The chemical reaction to produce the gaseous reactants and accordingly the required reaction pressure may be initiated electrically by leads 16 extending through the discrete material and if the heat of reaction does not result in a sufficiently elevated temperature, continued electrical heating of the graphite may be effected in the normal manner. Instead of using a chemical reaction to obtain a reaction pressure the material may be expanded by heating, for example by an electric current to generate the pressure.

The resulting outward pressure from the reaction zone will, as above stated, be dissipated outwardly by the very nature of the geometry of the cell and by interparticle friction so that the final pressure applied to the casing will be relatively small.

The pressure dissipation will also occur in a substantially uniform manner. This avoidance of any sharp or sudden pressure changes together with the fact that the segments 10 are wholly surrounded by the discrete material 4 and the wedges 6 backed by the discrete material 4 over substantially their whole length will reduce the tendency for breakage of the wedges 6 and segments 10 as would be likely to occur if they were subjected to high pressure drops over short distances.

Also since the wedges do not serve directly to apply pressure to the reaction zone and do not form the boundaries of the reaction zone they may be suitably designed to resist high pressures for example by making them relatively thin and avoiding any abrupt changes of contour. They are preferably circular in cross-section. Variations of form are indicated at 17 and 18 in FIG. 2.

To stabilise the temperature gradient while maintaining high pressure conditions the cooling coils with their inlet at 15 may be embedded in the mass of discrete material 4 in the outer relatively low pressure zone with rods or fins 19 extending inwardly to convey heat outwardly by conduction to liquid flowing in the cooling coil.

After the graphite to diamond conversion has been effected the external pressure on the assembly is gradually released and then the closure 11 in the hole in the casing 5 is loosened and/or removed. If the pressure of the chemical reactants is sufficient it may be possible thereby to separate a tubular core of discrete material plus the materials in the reaction zone. Otherwise the removal of such a core may be aided by a trepanning or coring type of operation to recover the diamond.

It will be appreciated that ideally the discrete material should, during pre-compression, allow for easy penetration of solid wedges and segments, whereas during the high pressure reaction period the greater the interparticle friction the better. The particulate material is chosen as far as possible to give a balance between these desirable characteristics. It may also consist of different layers with the outer layer or layers consisting of hard incompressible material, such as carbides of rare earth metals or the like, and the inner layer or layers in the reaction zone being of heat resistant material such as oxides of metals such as magnesium, calcium or aluminium.

It will be appreciated that any means may be used for producing the central internally developed pressure and that the cell may be used to subject any material to high pressure and, if desired, high temperature conditions.

Also it will be appreciated that by means of the apparatus the material being treated may be subjected to high pressure for prolonged periods in larger volume without high cost.

Figure 4:
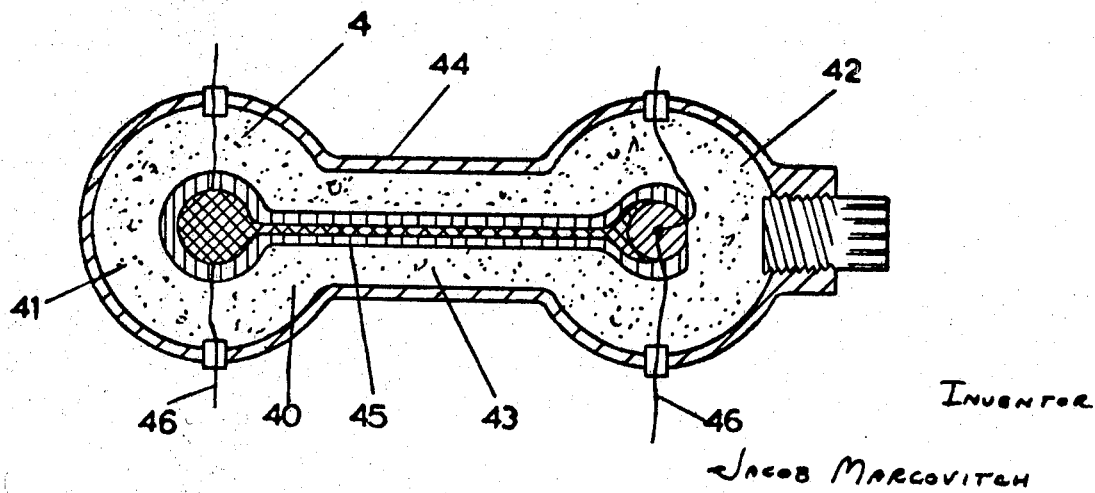
FIG. 4 illustrates an alternative arrangement of the pressure shell shown in FIGS. 1 and 2.

In order to facilitate control of the cell, in an alternative arrangement the final explosive or other source of pressure generation is not conducted in close proximity to the specimen which is to be subjected to the high temperature high pressure reaction but is located remotely as depicted in FIG. 4.

To obtain a transmission of very high pressure from a source of generation to a source of application has heretofore been limited to the tensile strength of known materials in very strong and thick walled transmission passages but it is considered that the particulate or highly ductile material described for use in the spherical reaction vessels can give a useful means of providing efficient pressure transference from one place to another and be far greater than has been used in the prior art.

It is envisaged that the invention will be particularly useful in pressurised reactors or conduits used for example in chemical plants, where a conduit may have a liner of a thin layer of an exotic and expensive material, tightly packed with inexpensive particulate material enclosed in an outer casing of mild steel, for instance.

In the embodiment shown in FIG. 4 a reaction cell 40 for the conversion of carbon in graphite form to diamond is made to a generally dumb-bell configuration with a specimen compact in one part-spherical portion 42 and in additional pressure generating means located centrally in the other part-spherical section 41, there being a connection in the form of a conduit 43 between these two parts.

The pressure generation may be derived from the expansive heating or reaction of a mass of suitable material, or both.

The portions between the spherical parts will comprise a shell 44 of steel or other retaining material around a central bore in the form of a narrow conduit 45 having walls of deformable material. Between these two components will be packed particulate material 4 which may be the same as that in the specimen containing part and which will also be compacted into the other spherical part around a suitable pressure generating unit. The conduit 45 will lead from this pressure generating unit so that it will be capable of transmitting this generated pressure to the specimen compact.

It will be appreciated that the specimen compact will be arranged as described above in the pervious embodiment.

With the arrangements above described it will be appreciated that pre-compression and pressure build up or pressure magnification of the specimen containing compartment 42 and the pressure generating compartment 41 can be effected in all possible manners including the driving of the wedge-shaped elements under the influence of rams, as described in detail with reference to FIG. 2 and not shown in FIG. 4 for reasons of clarity. The vibrations referred to in FIG. 2 embodiment may also be employed and may be of a violent or explosive nature, and cooling through cooling coils and any other means available may also be utilized as discussed in relation to FIG. 2 and may include jacketing the cell in an hydraulic envelope as previously described. Electrical energy through leads 46 may also be used.

Once the precompression has been effected the final pressure can be applied through the conduit 45 from the other spherical portion 41 and the pressure generator means will therefore be more easily controlled in the separate compartment of the cell.

The particulate material 4 affords the advantages of continuous and substantially even dissipation of the pressures which are generated as described in the earlier embodiment thus avoiding fractures at places of discontinuity which have been experienced with other solid anvil types of high pressure cells.

The use of the particulate material also affords very considerable advantages in the avoidance of difficult manufacturing problems in the preparation of the cells.

Figure 2:
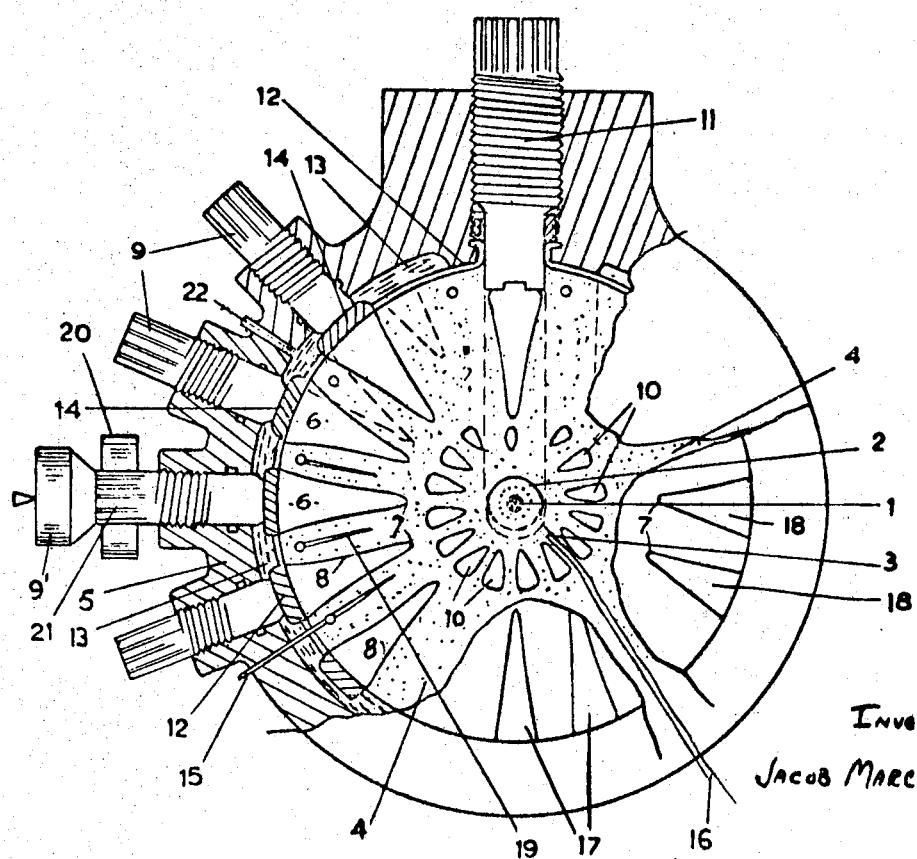
FIG. 2 illustrates diagrammatically a sectional view through one form of pressure generating apparatus.
Figure 3:
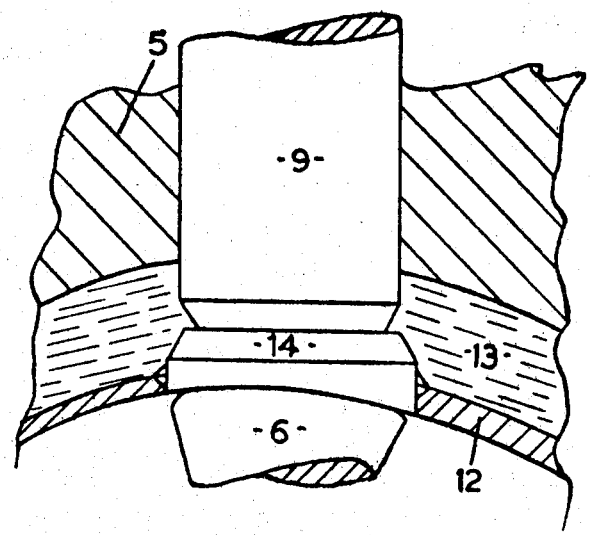
FIG. 3 an enlarged view of a portion of the shell shown in FIG. 2.

The access to either or both of the spherical parts 41, 42 of the cell can be made through different methods such as at 11 in the FIG. 2 embodiment, previously described.

It will be appreciated that the separate specimen enclosure and final pressure generation arrangement can be varied from the above described and it may even be possible to separate the two units by a short distance only while maintaining the advantage of transmission of pressure through a narrow conduit in a sheath of compacted particulate material.

In yet another variation this invention can be applied to a particular form of apparatus which is adapted to operate on a continuously fed specimen to which very high pressure is to be applied. It is known that very high pressures on metals during heat treatment for example, result in these metals adopting different properties.

In this embodiment it will be assumed that the specimen to be fed through the apparatus will be a rod of metal but it is to be understood that the invention is not to be considered as limited to such application. It may for example be arranged to be used with a specimen of limited length which is to be fed through the apparatus. Both specimens will generally be fed automatically due to the operation of the machine.

In the drawings FIGS. 5 to 9 illustrate a typical example of this apparatus.

Basically the apparatus according to this invention will be similar to that described but instead of the reaction chamber being surrounded by a spherical formation for applying the pressures, the chamber is in the form of an elongated tube 102 having deformable walls of material capable of withstanding the pressure and temperatures of operation on the specimen material.

This tube has a series of narrow closely adjacent pressure applying systems such as wedges 112, 114, 116, similar to the wedges aforedescribed and this system will operate in a mass of compacted particulate material 110 such as that aforedescribed.

In this form, the wedges embedded in the particulate material may comprise a closely adjacent series of radially extending wedges as at 112, 114, 116 or a coaxial stepped arrangement of wedges as described earlier in this specification as at 6 and 10 in FIG. 2. An outer casing 104 is provided to contain the particulate material. The end portions of the casing will preferably be conical and will include inwardly directed wedge assemblies.

Heating of the material to be treated is accomplished in the normal manner by resorting to electrical means through diametrically opposite points through wires 108 for each series of wedges. The details of the electrical leads and insulation through the back-up rams 126 are not shown.

The inner regions of the particulate material adjacent to the tube 102 may contain granular or powdered conductive material, or they may comprise a suitable metal to conduct electricity to a section of the tube.

As far as the design of the cell operating on continuously fed specimens or material is concerned it will be observed that the pressure that the central parallel cylindrical portion can withstand or dissipate is a function of its diameter compared with the spherical cell which is a function of the square of the diameter, so that a larger diameter cell is required to withstand the same pressure.

It is impractical to use chemical reactants to raise the pressure from within, except for establishing the general level of pressure initially, as this is a "once only" method. However, heating a reactant from within to obtain the pressure effect from its expansion may be resorted to. To this end, a suitable material may be situated and heated electrically, and cooled independently from the specimen material.

As the functioning of the cell depends on varying and controlling the pressure of each annular section independently, hydraulic means are used externally as it is readily and easily variable.

Figure 6:
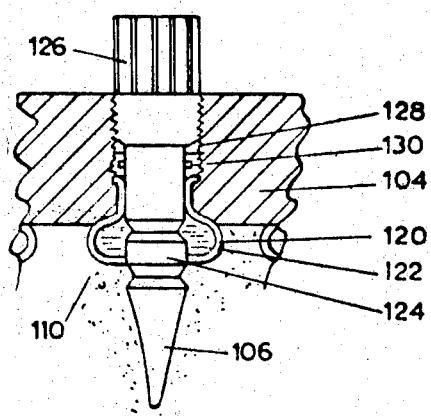
FIG. 6 shows the detail of a pressure applying ram and anvil.

FIG. 6 shows the detail of a pressure applying ram 126 through an anvil 124 as before. The annular envelope 120, pressurized by fluid 122, has a series of openings to receive the wedges and may also apply pressure on the particulate material adjacent to the casing 104.

With this arrangement it will be understood that a sequential application of pressures can be applied along the length of the apparatus with the particulate material ensuring a uniform and continuous dissipation of the pressures outwardly from the axial core. The pressures can thus also be arranged to ensure that there is a natural undulation along the tube which ensures a forward movement of any specimen introduced under a predetermined minimum pressure into the apparatus.

This pressure undulation may be arranged to ensure axial movement of the specimen or a specimen may be left in situ and treated for high pressure sequentially along most of its length to be subsequently removed from the apparatus.

Figure 7:
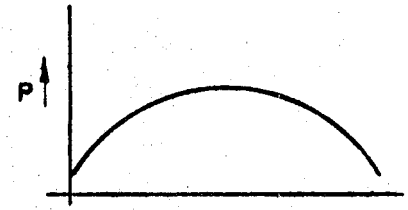
FIG. 7 graphically represents the pressure prevailing initially in the cell under "no-flow" conditions.

The pressure prevailing initially in the cell (under "no-flow" conditions) is represented graphically in FIG. 7. Under these conditions, static frictional forces balance the pressure.

Figure 5:
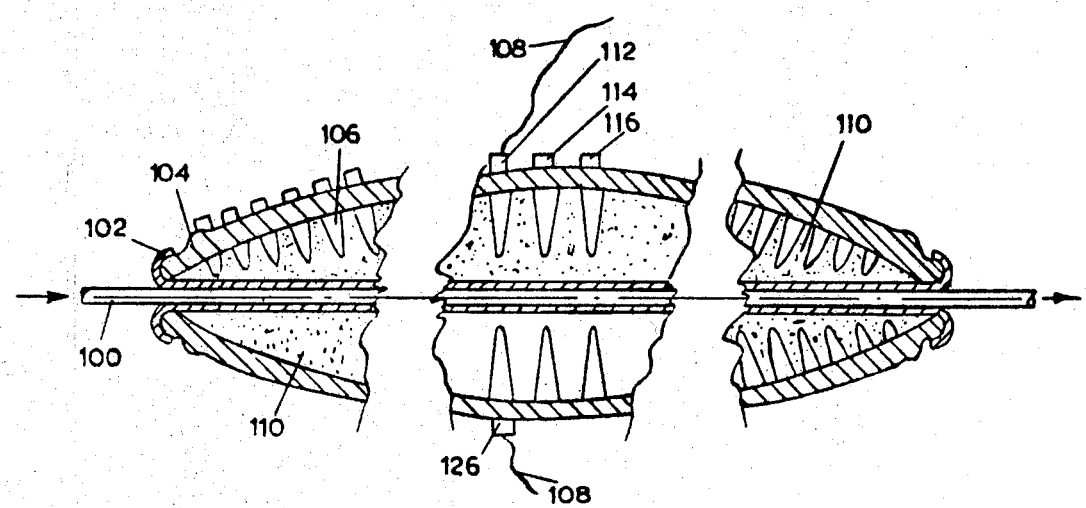
FIG. 5 illustrates a still further form of the invention.

Flow of the material 100 through tube 102 can be achieved by ensuring that the pressure dissipation towards the inlet of the apparatus through the particulate material is less from one annular series of pressure applying means than the increase between adjacent series. In other words, the gradient of the pressure wave in the forward direction, or from left to right as viewed in FIG. 5, is greater than the pressure gradient behind the peak and the pressure differential between the annular series in the forward direction is sufficient to ensure flow.

Figure 8:
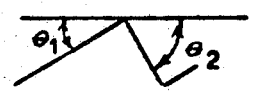
FIG. 8 illustrates graphically the pressure drop or gradient along the apparatus of FIG. 5.
Figure 9:
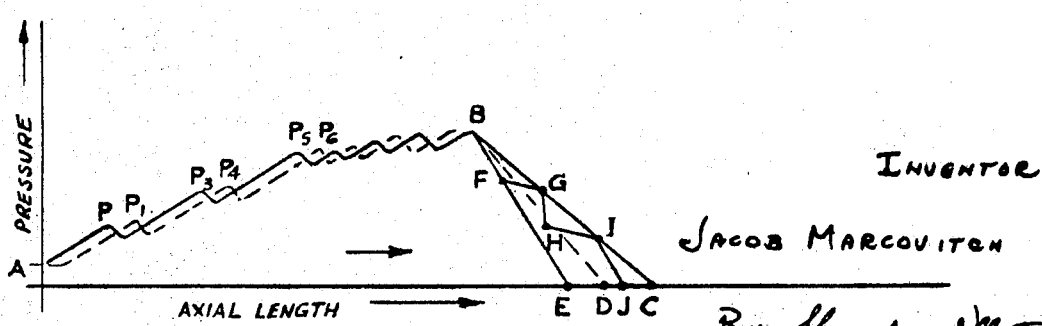
FIG. 9 illustrates graphically the pressure waves generated along the apparatus of FIG. 5.

The induced series of "pressure waves" are shown graphically in FIG. 9, with their momentary peaks at P, P3, P5. In FIG. 8 the pressure drop or gradient $\theta 1$, is insufficient to cause flow towards the left-hand side or inlet, whereas $\theta 2$ is great enough to overcome the static frictional force and there is enough force to induce a localized dynamic condition—or cause flow along the cell.

From the parallel portion—a region of substantially constant pressure and where the desired reaction or treatment of the material takes place—the pressure begins to drop at B. The line BD represents the minimum gradient for "no flow" conditions. The gradient BC is insufficient but with BE flow may take place. Inducing a wave BFGHIJ will also allow flow to take place.

The dotted line with peaks P1, P4, P6 represents another position of the wave.

Also it will be appreciated that along the length of the tube the pressure can be built up, maintained and then gradually or suddenly released or built up and released without any period of maintenance. This provides a wide range of operating conditions which can be arranged with relative ease with any particular apparatus made in accordance with this invention.

In all embodiments the use of particulate material as a direct or back up material ensures that there is no sudden discontinuity and consequent weakness in the pressure applying and magnifying and/or dissipating medium. Also there is a continous arrangement for specimens fed through the apparatus preferably from the axis of the low pressure side.

In actual use all convenient methods of precompression and final compression may be utilised.

From the above it will be appreciated that a wide variation in detail can be employed without departing from the basic scope of this invention.

In particular, due to the fact that the pressure gradient can be suddenly or gradually generated, maintained and released it is envisaged that a continuously operating cycle can be used for the manufacture of synthetic diamond from carbonaceous material introduced under a positive pressure into the inlet.

In an extended use of the cell, the outer end of the casing may be provided with a well supported die assembly to reduce rod fed therethrough or to produce fine filaments or "extrusions" of a variety of shapes.

In a further embodiment, fine filaments or wires are introduced with a granular material to be compacted and treated to yield a composite with reinforcement.

It may well be that the tube is allowed to be extruded with the material and continuously replaced or that the tube may be dispensed with and particulate material be continuously introduced under pressure around the specimen material.

What I claim as new and desire to secure by Letters Patent is:

1. A high pressure cell for containing high pressures, comprising a reaction zone, said reaction zone including a specimen to be subjected to said high pressures, means in said reaction zone for reactively generating said high pressures, heat resistant easily deformable sheath means at least partially surrounding said specimen, a continuous mass of material of low tensile strength and capable of transmitting and dissipating high pressure surrounding the reaction zone, and an outer shell of material having high tensile strength enclosing the material of low tensile strength.

2. A high pressure cell as claimed in claim 1 wherein pressure magnifying rigid bodies are symmetrically arranged around the reaction zone and embedded in the mass of low tensile strength material.

3. A high presure cell apparatus as claimed in claim 1 in which the low tensile strength material is a normally very ductile metal.

4. A high pressure cell as claimed in claim 1 in which the low tensile strength material is a particulate material.

5. A high pressure cell apparatus as claimed in claim 1 in which the low tensile strength material is graded ceramic particulate material of varying size.

6. A high presure cell as claimed in claim 1 in which the low tensile strength material is a mixture of the following materials:
   (i) normally very ductile material;
   (ii) particulate material of varying size; and
   (iii) graded ceramic material.

7. A high pressure cell as claimed in claim 1 in which the sheath means comprises a deformable refractory material.

8. A high pressure cell, as claimed in claim 1, in which the shell is of substantially spherical shape.

9. A high pressure cell, as claimed in claim 1 in which the pressure generating means is in communication with the reaction zone through a suitable conduit surrounded by material of low tensile strength.

10. Apparatus as claimed in claim 9 in which the shell is of elongated cylindrical shape with a sheathed bore forming a reaction zone.

11. Apparatus as claimed in claim 10 in which a series of annularly arranged pressure manipulating means are provided and also for the ingress and egress of material through the bore.

12. A high pressure cell as claimed in claim 2 in which the pressure magnifying bodies are shaped to avoid any abrupt change in section.

13. A high pressure cell as claimed in claim 12 in which the rigid pressure magnifying bodies are a series of laterally adjacent wedges inwardly directed and embedded in the mass of low tensile strength material but enabling pressure to be applied to the outer parts thereof.

14. A high pressure cell as claimed in claim 13 in which the wedges are of conical shape.

15. A high pressure cell as claimed in claim 13 in which the wedges are rounded and have sides of concave arcuate configuration.

16. A high pressure cell as claimed in claim 15 in which the wedges are of circular cross-section.

17. A high pressure cell as claimed in claim 12 in which longitudinally adjacent wedges of the type defined are provided which wedges diminish in size toward the reaction zone.

18. A high pressure cell as claimed in claim 1 wherein is included means for compressing the material of low tensile strength.

19. A high pressure cell as claimed in claim 4 wherein the particulate material is of varying size.

20. A high pressure cell as claimed in claim 18 wherein the compressing means includes power operated rams.

21. A high pressure cell as claimed in claim 18 wherein the compressing means includes vibratory equipment.

22. A high pressure cell as claimed in claim 18 wherein the compressing means includes percussive equipment.

23. A high pressure cell as claimed in claim 18 wherein the compressing means includes hydraulic pressure jackets.

24. A high pressure cell as claimed in claim 1 wherein the cell is substantially dumb-bell shaped and includes two substantially spherical portions joined by a tubular portion, said means for generating high pressure disposed in one of said spherical portions and said specimen disposed in the other of said spherical portions.

25. A high pressure cell as claimed in claim 1 wherein the cell is substantially spherical and said reaction zone is located substantially at the center of said sphere.

26. A high pressure cell as claimed in claim 3 wherein said low tensile strength material comprises lead.

27. A high pressure cell as claimed in claim 4 wherein said particulate material comprises sand.

References Cited

UNITED STATES PATENTS

| | | | |
|---|---|---|---|
| 2,499,530 | 3/1950 | Scott | 18—H. Pres. Dig. |
| 2,918,699 | 12/1959 | Hall | 18—H. Pres. Dig. |
| 2,947,034 | 8/1960 | Wentorf | 18—H. Pres. Dig. |
| 3,044,113 | 7/1962 | Gerard et al. | 18—H. Pres. Dig. |
| 3,067,465 | 12/1962 | Giardini et al. | 18—H. Pres. Dig. |
| 3,075,245 | 1/1963 | Bundy | 18—H. Pres. Dig. |
| 3,150,413 | 9/1964 | Zeitlin et al. | 18—H. Pres. Dig. |
| 3,230,286 | 1/1966 | Bobrowsky | 18—H. Pres. Dig. |
| 3,313,871 | 4/1967 | Bogel et al. | 18—H. Pres. Dig. |
| 3,379,043 | 4/1968 | Fuchs | 18—H. Pres. Dig. |

H. A. KILBY, Jr., Primary Examiner